J. T. FERRES.
CORNER FASTENER FOR PLATE GLASS.
APPLICATION FILED AUG. 12, 1909.
984,267.
Patented Feb. 14, 1911.
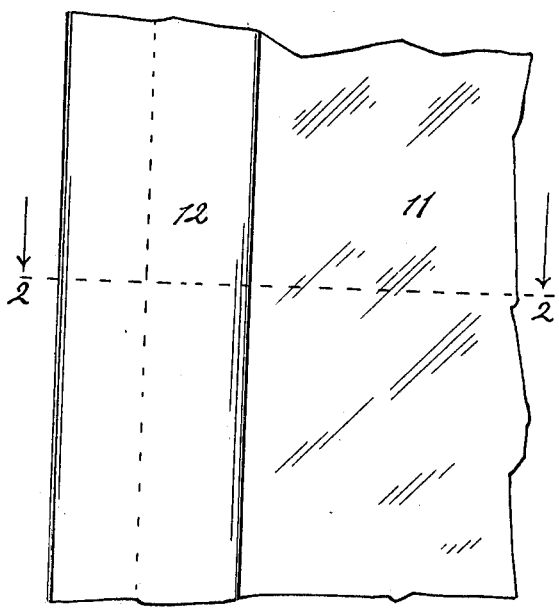
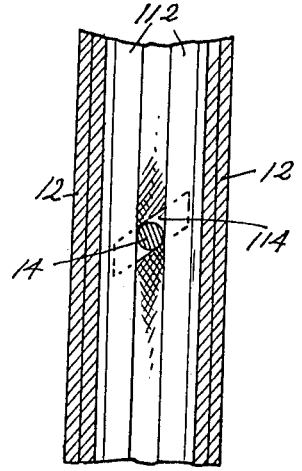
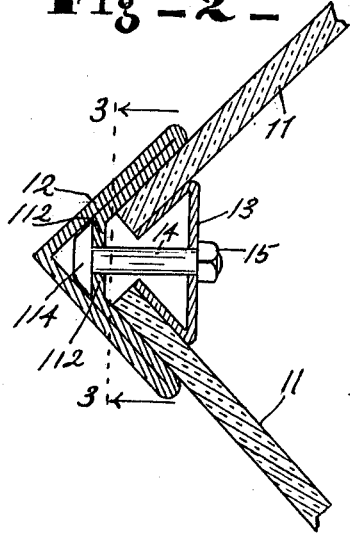
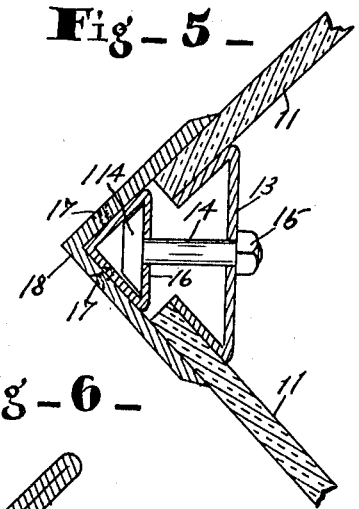
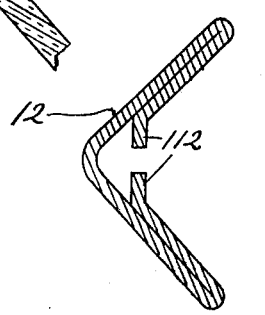
WITNESSES:
W. M. Gentle
G. H. Bonk
INVENTOR.
Jeffrey T. Ferres.
BY
V. H. Lockwood
ATTORNEY.

UNITED STATES PATENT OFFICE.

JEFFREY T. FERRES, OF ANDERSON, INDIANA.

CORNER-FASTENER FOR PLATE-GLASS.

984,267.

Specification of Letters Patent.

Patented Feb. 14, 1911.

Application filed August 12, 1909. Serial No. 512,510.

*To all whom it may concern:*

Be it known that I, JEFFREY T. FERRES, of Anderson, county of Madison, and State of Indiana, have invented a certain new and useful Corner-Fastener for Plate-Glass; and I do hereby declare that the following is a full, clear, and exact description thereof, reference being had to the accompanying drawings, in which like letters refer to like parts.

The object of this invention is to provide an improved construction and arrangement of a metal corner fastening for holding and joining plate glass and other plates or articles when they are located at an angle to each other.

The chief feature of the invention consists in forming a two-part clamp united by a removable bolt, one part overlapping the outer edges of the adjacent glass plates and having a web or inwardly extending flanges arranged on the inside and transversely of said outer brace portion and slotted to receive a peculiarly formed bolt head. The other part is a plate formed somewhat wedge-shaped for wedging against the inner surface of the glass plates. The head of the bolt is so arranged that it can be inserted in the slot and turned laterally, and therefore can readily be detached.

The full nature of the invention will be understood from the accompanying drawings and the following description and claims:

In the drawings Figure 1 is a side elevation of a small portion of a plate glass window with the corner fastening in place. Fig. 2 is a transverse section on the line 2—2 of Fig. 1. Fig. 3 is a vertical section on the line 3—3 of Fig. 2. Fig. 4 is a section through the bolt alone on the line 3—3 of Fig. 2. Fig. 5 is a horizontal section showing a modified form. Fig. 6 is a cross section of a modified form of the outer clamping bar with the external angle rounding.

In the drawings there are shown a pair of glass plates 11, which are positioned at right angles to each other and are secured together at their junctures by an outer overlapping clamping metal strip or bar 12 and an inner wedging clamping strip or bar 13 clamped and drawn tightly together by the bolt 14 and nut 15.

The outer clamping bar 12 is formed of a single plate of metal centrally bent at a right angle and each side thereof bent substantially centrally, inwardly and backwardly on itself, the inner edges 112 of the inner fold of said strip of metal being bent or extended transversely to form two oppositely located flanges having a slot between them wide enough to receive the bolt 14. The head 114 of the bolt 14 is in the form of a rhomboid, the width of which is substantially the same as the diameter of the bolt, but the length of the head is considerably greater than the width of the bolt, so that the head of the bolt can be inserted through the slot in the outer brace bar, and when inserted can be turned crosswise, as indicated in Figs. 2 and 3. It will hold tightly on the flanges 112 in its crosswise position, and yet at any time it can be readily removed, if desired. The inner wedging clamping member or strip 13 is likewise formed of one plate of metal, bent at two points so as to form in cross section an incomplete triangle, one angle thereof being slotted or open for the bolt 14. The base or wider side of said clamping member 13 has a hole in it to receive the bolt 14, and when the nut 15 is applied to said bolt, the two clamping members or bars are drawn together tightly and thus hold the two glass plates 11 united.

The modified form shown in Fig. 5 has a triangular portion 16 secured by a rivet 17 in the inner angle of the outer clamping or bracing member 18 and which is formed of one strip of metal centrally bent to form a right angle in cross section. The inner triangular portion 16 is centrally slotted like the outer bracing member 12 in Fig. 3 to receive the head of the bolt 14.

While a right angle fastening is here shown and described, the invention is not necessarily limited to any particular angle between the plates of glass or the parts of the fastening.

What I claim as my invention and desire to secure by Letters Patent is:

A corner fastener for plates disposed at an angle to each other, which fastener consists of an outer clamping member overlapping the edges of the plates with the edges of said clamping member bent inwardly close upon itself in position to engage the plates and with the extreme portions of said edges bent so as to be in alinement with each other and to extend across an inner angle of said member but without meeting each other, an inner clamping member, a bolt having an elongated head adapted to be inserted between the free edges of said overlapping clamping member and then turned so as to overlap said edges and with a threaded portion extending through a hole in the inner clamping member, and a nut for said bolt.

In witness whereof, I have hereunto affixed my signature in the presence of the witnesses herein named.

JEFFREY T. FERRES.

Witnesses:
  F. V. POWELL,
  M. L. TWOMLEY.